United States Patent
Son et al.

(10) Patent No.: US 7,508,482 B2
(45) Date of Patent: Mar. 24, 2009

(54) CASSETTE AND METHOD FOR FABRICATING LIQUID CRYSTAL DISPLAY DEVICE USING THE SAME

(75) Inventors: Jang Heon Son, Seoul (KR); Sang Hun Cha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 637 days.

(21) Appl. No.: 11/312,503

(22) Filed: Dec. 21, 2005

(65) Prior Publication Data

US 2006/0290876 A1     Dec. 28, 2006

(30) Foreign Application Priority Data

Jun. 25, 2005     (KR) ..................... 10-2005-0055391

(51) Int. Cl.
G02F 1/13       (2006.01)
G02F 1/1333     (2006.01)
B65D 85/48      (2006.01)

(52) U.S. Cl. .................. 349/187; 349/58; 206/454
(58) Field of Classification Search ................ 349/187, 349/58; 206/454
See application file for complete search history.

(56) References Cited

U.S. PATENT DOCUMENTS

| | | | | |
|---|---|---|---|---|
| 5,890,598 A * | 4/1999 | Hayashida et al. | .......... | 206/710 |
| 6,769,948 B1 * | 8/2004 | Inoue | .......... | 445/66 |
| 7,109,483 B2 * | 9/2006 | Nakasuji et al. | .......... | 250/310 |
| 7,295,279 B2 * | 11/2007 | Byun et al. | .......... | 349/187 |
| 7,334,690 B2 * | 2/2008 | Huang et al. | .......... | 211/41.18 |
| 7,431,158 B2 * | 10/2008 | Yamada et al. | .......... | 206/454 |
| 2003/0179341 A1 * | 9/2003 | Choo | .......... | 349/187 |
| 2004/0108284 A1 * | 6/2004 | Huang et al. | .......... | 211/41.18 |
| 2004/0200788 A1 * | 10/2004 | Shon et al. | .......... | 211/41.18 |
| 2005/0226779 A1 * | 10/2005 | Oldham et al. | .......... | 422/99 |

FOREIGN PATENT DOCUMENTS

| | | |
|---|---|---|
| CN | 2424674 Y | 3/2001 |
| JP | 11-186374 A | 7/1999 |

* cited by examiner

*Primary Examiner*—Mike Qi
(74) *Attorney, Agent, or Firm*—McKenna Long & Aldridge LLP

(57) ABSTRACT

A cassette and a method for fabricating a liquid crystal display device. The cassette comprises a frame having a box shape, at least one side plate movably positioned at an inner side surface of the frame and having a plurality of slots, a model converting device disposed at a certain region of upper and lower surfaces of the frame, and a converting lever positioned in the model converting device for moving the side plate according to a size of a glass to be received.

27 Claims, 6 Drawing Sheets

US 7,508,482 B2

CASSETTE AND METHOD FOR FABRICATING LIQUID CRYSTAL DISPLAY DEVICE USING THE SAME

This application claims the benefit of Korean Patent Application No. 55391/2005, filed on Jun. 25, 2005, which is incorporated by reference for all purposes as if fully set forth herein.

BACKGROUND OF THE INVENTION

1. Field of the Invention

The present invention relates to a cassette, and more particularly, to a cassette capable of storing a substrate and transferring the substrate in a fabrication process for a liquid crystal display (LCD) device, and a method for fabricating a liquid crystal display (LCD) device using the same.

2. Discussion of the Related Art

Recently, because of the high demand for portable information systems having displays, lightweight, thin film type flat panel display (FPD) devices have been actively being researched and commercialized replacements for conventional cathode ray tube (CRT) devices. Among these flat panel display devices is the liquid crystal display (LCD) device which displays an images using the optical anisotropy of a liquid crystal. An LCD can be used in notebook computers, as a desktop monitor, and in other display applications due to its excellent resolution, color rendering capability and picture quality.

Hereinafter, the LCD device will be explained in more detail.

The LCD device comprises an LCD panel including a driving circuit unit, a backlight unit installed at a lower surface of the LCD panel for emitting light to the LCD panel, a mold frame for supporting the backlight unit and the LCD panel, and a case.

The LCD panel chiefly includes a color filter substrate, an array substrate, and a liquid crystal layer formed between the color filter substrate and the array substrate.

The color filter substrate includes a color filter constituted by sub-color filters of R, G, and B, a black matrix for dividing the sub-color filters from each other and shielding light passing through a liquid crystal layer, and a transparent common electrode for applying a voltage to the liquid crystal layer.

The array substrate includes a plurality of gate lines and data lines arranged on the substrate in horizontal and vertical directions defining a plurality of pixel regions; a thin film transistor (TFT) employed as a switching device formed at each intersection region between the gate lines and the data lines; and a pixel electrode formed on the pixel region.

The array substrate and the color filter substrate are attached to each other by a sealant formed at an outer periphery of a pixel region, the attached substrates constituting the LCD panel. The two substrates are aligned and attached to each other using an attachment key formed on the array substrate or the color filter substrate.

The LCD panel is fabricated by an array process for forming a switching device on an array substrate, a color filter process for forming a color filter on a color filter substrate, and a cell process. The fabrication process comprises different unit processes connected to one another. Each unit process is performed by a different equipment, and each different equipment requires a cassette for storing a substrate of the LCD panel (e.g. a glass).

The LCD panel must be fabricated in a place having a high degree of cleanliness. Therefore, substrates for the LCD panel may be stored in the cassette for transferred between processes. The LCD panel may be stored in a stocker for a temporary storing.

FIG. 1 is a perspective view schematically showing a cassette in accordance with the related art.

As shown in FIG. 1, the cassette 1 comprises a frame 3 of a box shape, side plates 2, and a plurality of slots 4 formed at each side plate 2 for receiving a plurality of glasses therein as multiple layers to form an LCD panel.

Each side plate 2 is formed at a side surface of the cassette 1. The, side plates provide support for the frame 3, and the slots 4 protruding from the side plates 2 support glasses received in the cassette 1 by either a point contact or a surface contact.

FIG. 2 is a disassembled perspective view schematically showing a model converting device of the cassette in accordance with the related art.

As shown, the model converting device 10 is a plate provided with openings 15 at positions corresponding to the sizes of glasses to be received.

A model converting device 10 is installed at each of the four corners of upper and lower surfaces of the cassette 1, and the side plate 2 having slots 4 is movably positioned in the cassette 1. The side plate 2 is transferred to a corresponding opening 15 of the model converting device 10 according to a size of a glass to be received. Then, the model converting device 10 and the side plate 2 are coupled to each other using a screw 11 and a washer 12.

Reference numerals 14, 17, 19, and 20.1 denote each size expressed in inches of an LCD panel to be formed of a certain glass. The openings 15 are formed at each of the sizes. When changing the glass model size used in the cassette 1, a screw coupling operation is to be performed at the upper and lower surfaces at each corner of the cassette. At least eight such screw coupling operations are required, making the changing of glass models a complicated process. Also, frequent glass model changes require frequent screw coupling operations resulting in wearing of the model converting device 10.

Furthermore, the cassette 1 has a weight of more than 50 kg, so that more than one operator is required to operate the cassette 1 to changing a glass model. The glass model change operation for the cassette of the related art is a lengthy process which degrades the efficiency of operating the cassette.

SUMMARY OF THE INVENTION

Accordingly, the present invention is directed to a cassette and method for fabricating liquid crystal display device using the same that substantially obviates one or more of the problems due to limitations and disadvantages of the related art.

An advantage of the present invention is to provide a cassette capable of effectively operating so as to easily respond to a change of a glass model for a liquid crystal display (LCD) panel, and a method for fabricating an LCD device using the same.

To achieve these and other advantages and in accordance with the purpose of the present invention, as embodied and broadly described herein, there is provided a cassette, comprising: a frame having a box shape; at least one side plate movably positioned at an inner side surface of the frame and having a plurality of slots; a model converting device disposed at a certain region of upper and lower surfaces of the frame; and a converting lever positioned in the model converting device for moving the side plate according to a size of a glass to be received.

In another aspect of the present invention, there is also provided a method for fabricating an LCD device, comprising: preparing glasses for an LCD device; performing an array process or a color filter process on the glasses; transferring the glasses received in a cassette to plural unit process steps for the array process and the color filter process by transferring the cassette comprising a frame having a box shape, at least one side plate movably positioned at an inner side surface of the frame and having a plurality of slots, a model converting device disposed at a certain region of upper and lower surfaces of the frame, and a converting lever positioned in the model converting device for moving the side plate according to a size of a glass to be received; attaching two glasses having undergone the array process and the color filter process; and cutting the attached glass into a plurality of unit LCD panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, a cassette and a method for fabricating a liquid crystal display (LCD) device using the same will be explained with reference to the attached drawings.

Figure 1:
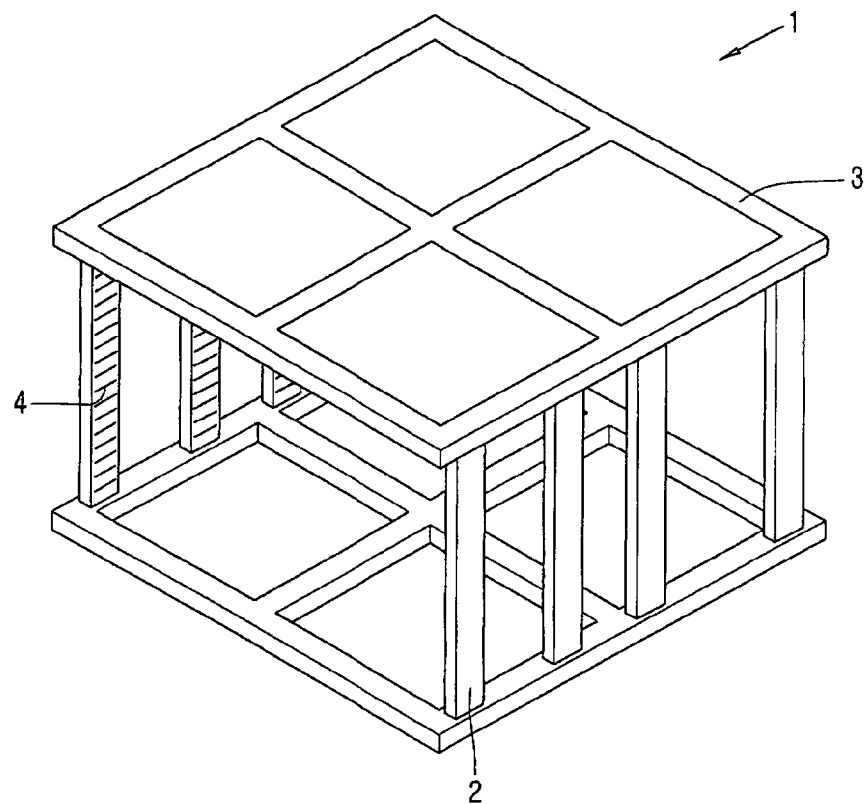
FIG. 1 is a perspective view schematically showing a cassette in accordance with the related art.
Figure 2:
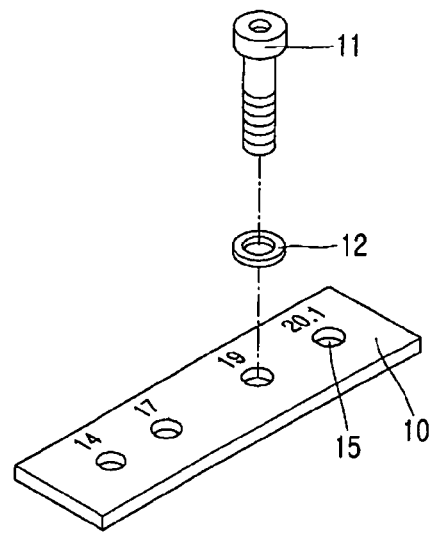
FIG. 2 is a disassembled perspective view schematically showing a model converting device of the cassette in accordance with the related art.
Figure 3:
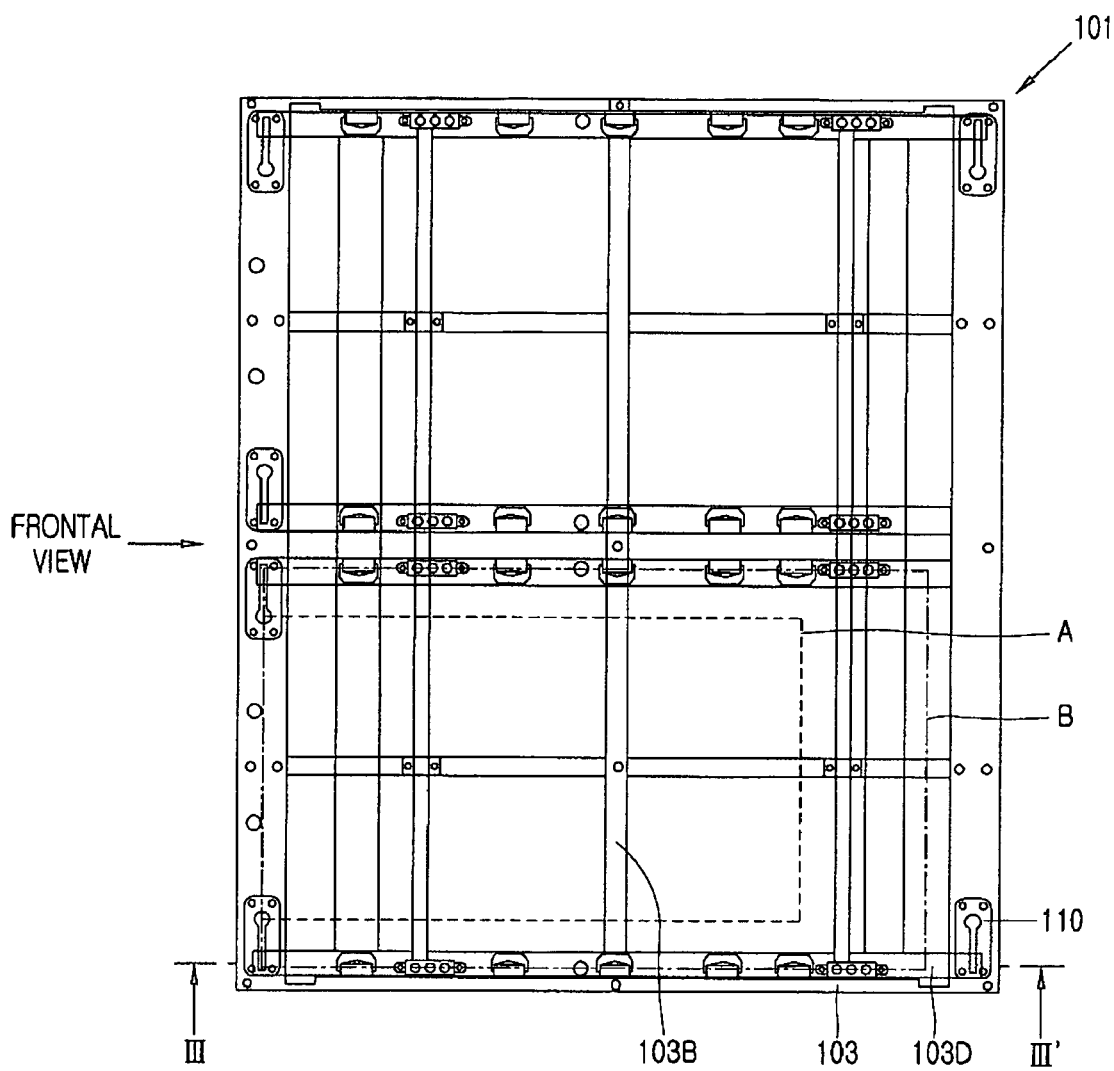
FIG. 3 is a plane view schematically showing a cassette according to an embodiment of the present invention.
Figure 4:
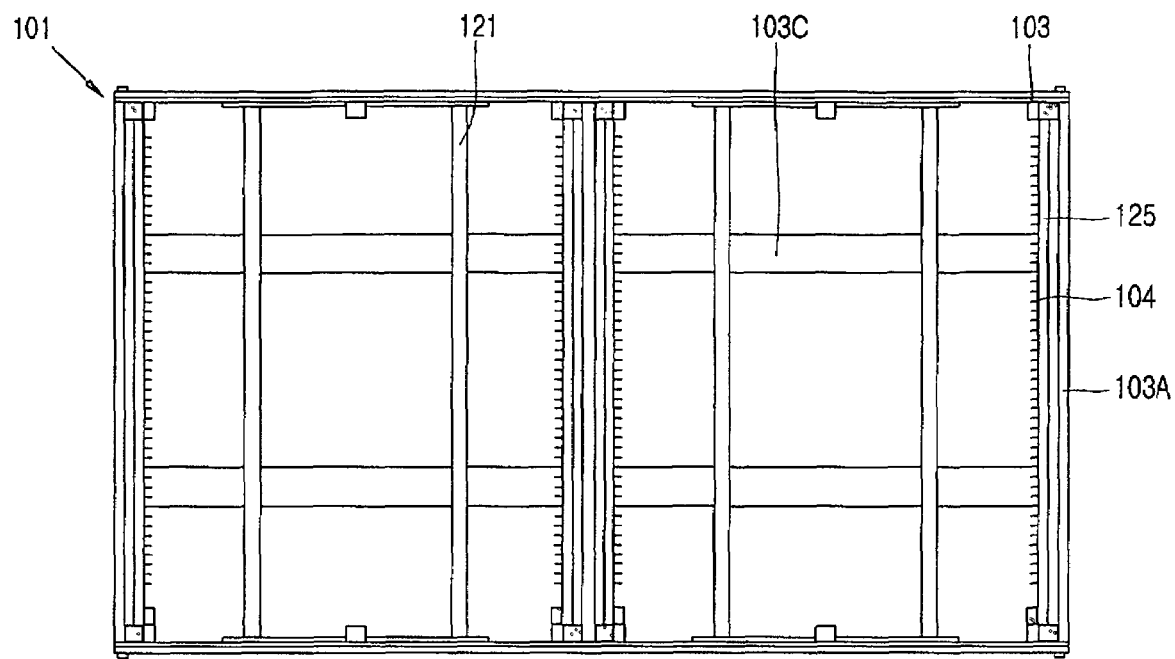
FIG. 4 is a lateral view schematically showing the cassette according to an embodiment of the present invention.
Figure 5:
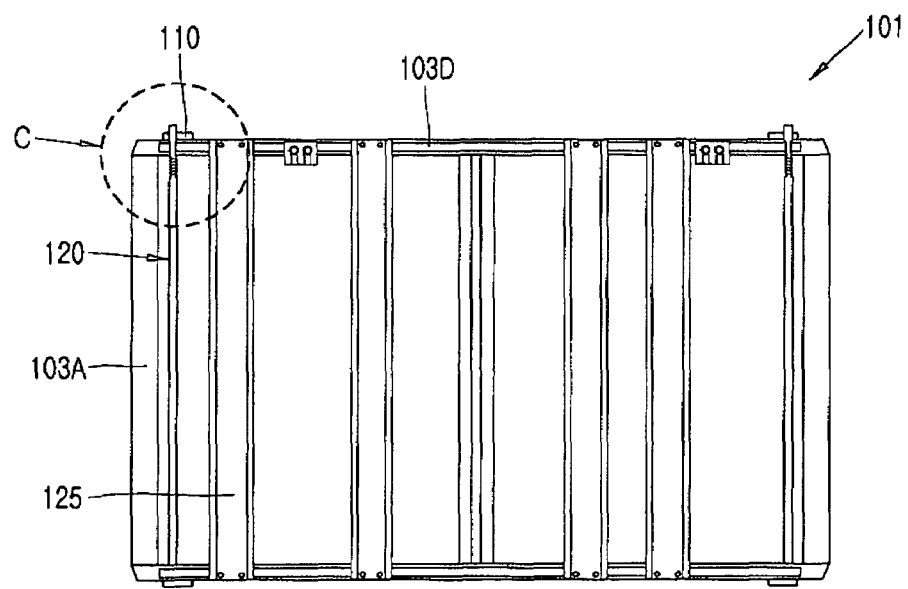
FIG. 5 is a sectional view taken along line III-III' in FIG. 3.

FIG. 3 is a plane view schematically showing a cassette according to an embodiment of the present invention, FIG. 4 is a lateral view schematically showing the cassette according to an embodiment of the present invention, and FIG. 5 is a sectional view taken along line III-III' in FIG. 3.

While the drawings depict a cassette unit including two cassettes the present invention is not limited to construction having two cassettes.

As shown, a cassette 101 includes a frame 103 having a box shape of which a front surface is open, and side plates 125 movably disposed at inner side surfaces of the frame 103 and having a plurality of slots 104. The frame 103 includes a lateral frame 103A, an upper frame 103B, and a rear frame 103C.

The lateral frame 103A, the upper frame 103B, and the rear frame 103C are coupled to one another by means such as screws, welding, or other equivalent fastening means.

The slots 104 are arranged at an inner side surface of the side plates 125 with a certain gap. The slots support a received mother substrate (e.g. a glass) by a point contact or a surface contact.

The slots 104 and the side plates 125 may be formed of teflon in order to minimize an impact to a received glass. If the slot 104 and the side plates 125 are formed of teflon, friction between a received glass and the slot 104 and between a received glass and a side plate 125 may be minimized to prevent the generation of an electrostatic potential.

The cassette 101 is provided with a model converting device 110 having at each four corner of upper and lower surfaces of the frame 103 in order to control a width between facing sets of right and left slots 104 to change the size of the glass to be received. As illustrated in FIG. 5, the cassette 101 is also provided with change rods 120 connected to the model converting device 110 for moving the right and left side plates 125 each having slots 104 in running in the width direction of the cassette 101.

The right and left sides face towards each other when the cassette 101 is viewed from the front.

In the cassette illustrated in FIGS. 3, 4, and 5, one side of the cassette 101 is provided with four side plates 125 and two change rods 120. However, the number of the side plates 125 and the number of the change rods 120 are not limited to the above numbers. Furthermore, in the illustrated embodiment invention, a model converting device 110 is installed at each of the four corners of the upper and lower surfaces of one frame 103. However, the number and positions of the model converting devices 110 are not limited to those illustrated.

The side plates 125 and the change rods 120 are respectively connected to a guide frame 103D formed at the upper and lower surfaces of the frame 103 in a horizontal direction. As a change rod 120 moves, the associated side plates 125 move in the same direction as the change rod 120.

A width between the side plates 125 and a width between the change rods 120 are controlled according to a size of a glass to be received. (e.g. glasses A and B of differing sizes represented by dotted lines in FIG. 3). The width control is performed by operating the converting lever of the model converting device 110, as will be explained in more detail hereafter.

Figure 6:
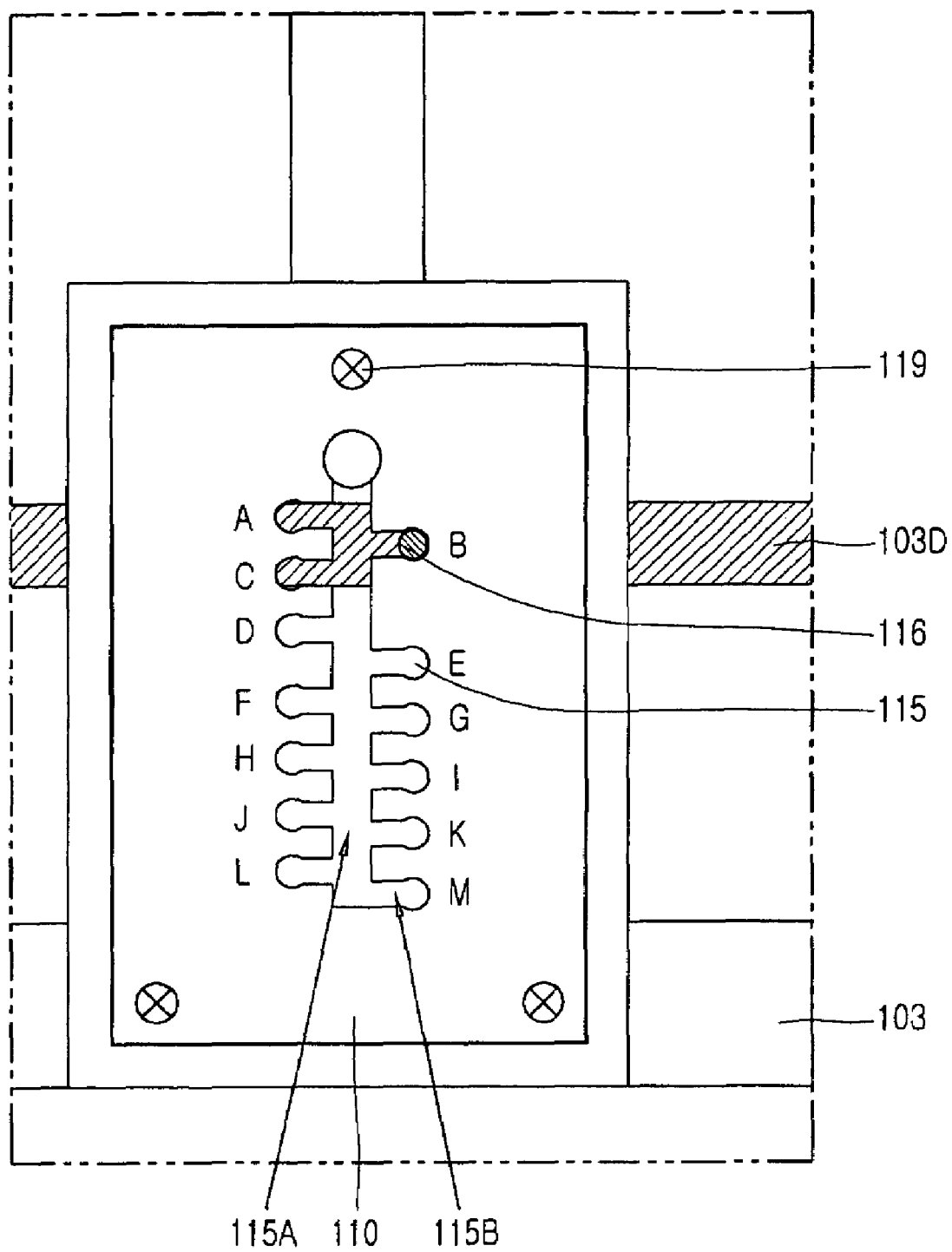
FIG. 6 is a plane view schematically showing a model converting device of the cassette of FIG. 3.

FIG. 6 is a plane view schematically showing a model converting device of the cassette of FIG. 3.

As shown, the model converting device 110 is formed as a rectangular plate, having openings 115 for inserting the converting lever 116 formed at positions corresponding to each size of glasses to be received. The opening 115 can have a circular shape. The model converting device 110 may be fixed to the frame 103 by screws 119.

Alphabetic symbols A to M for indicating each size of glass to be received are displayed on a surface of the model converting device 110. The alphabetic symbols A to M correspond one to one to the openings 115 for each size of glass to be received. Other symbols may be used to indicate the size of the glass to be received.

The converting lever 116 is connected to a change rod through the guide frame 103D. The guide frame 103D and the change rod are together moved by operating the converting lever 116.

A first passage 115A along which the converting lever 116 moves is formed at the model converting device 110 in a longitudinal direction, and second passages 115B protruding in a branch form are positioned at right and left sides of the first passage 115A. Each of the second passages 115B are respectively provided with an opening 115 at the end thereof, so that the converting lever 116 may to be moved to the opening 115.

The width of each second passage 115B is formed to be less than the width of the corresponding opening 115 at the end of the passage 115B so as to prevent the converting lever 116 from moving out of the opening 115, and thus preventing the guide frame 103D and change rod from moving after the converting lever 116 is inserted into the opening 115. to complete a model change operation.

An operator moves the converting lever 116 or the change rod to the upper side of the model converting device 110, and then moves the converting lever 116 along the first passage 115A and then along a second passage 115B of the model converting device 110 corresponding to a size of a glass to be received. Then, the operator inserts the converting lever 116 into the opening 115 formed at a position corresponding to a size of a glass to be received. As will be described with reference to FIGS. 7A and 7B, an elastic member 122 such as a spring is installed between the converting lever 116 and the change rod. Accordingly, if the converting lever 116 or the change rod that has moved to the upper side of the model converting device 110 is released, the converting lever 116 or the change rod is automatically returned to the lower original position.

Thus, the width between right and left side plates is easily controlled by operating the converting lever 116 or the change rod in a single operation, and thus the width between the facing side plates 125 may be easily adjusted to correspond to a size of a glass to be received.

Figure 7A:
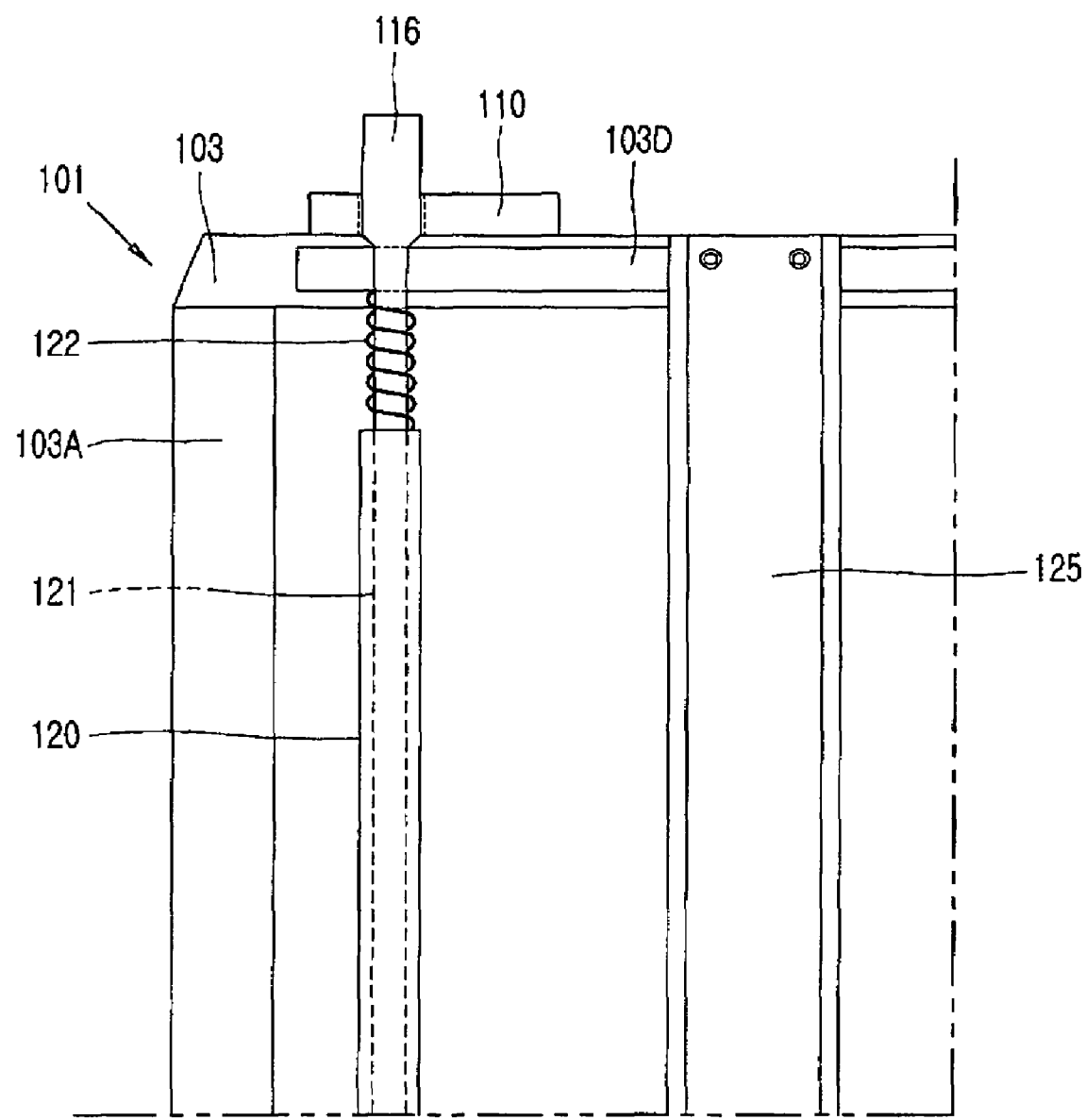
FIGS. 7A and 7B are lateral views showing a part 'C' of the cassette in FIG. by enlargement.
Figure 7B:
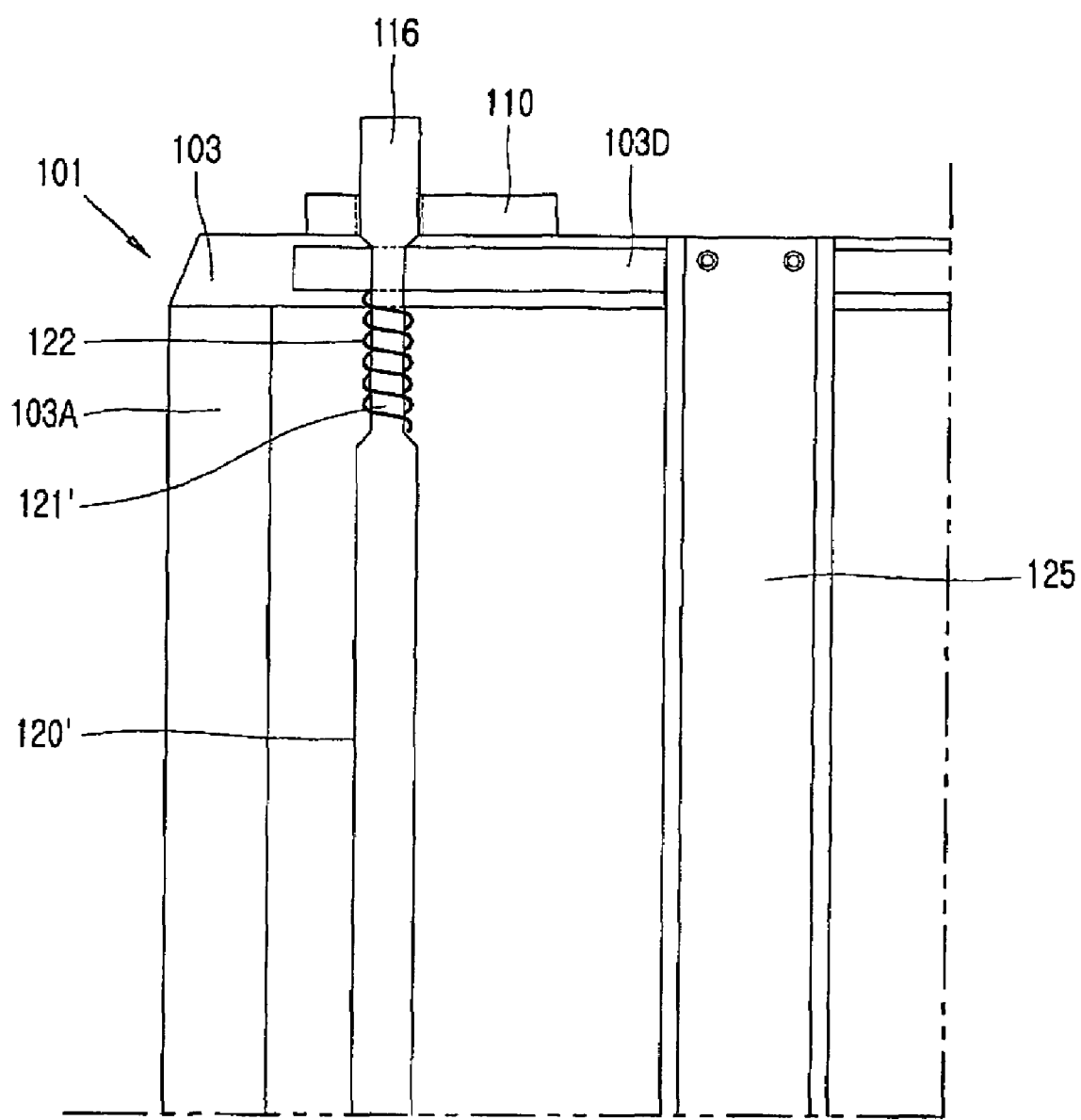

FIGS. 7A and 7B are lateral views showing a part of 'C' of the cassette in FIG. 5 by enlargement.

In FIG. 7A, the converting lever 116 is connected to a supporter 121 formed at a lower portion thereof. The supporter 121 may be inserted into the change rod 120 so that the supporter 121 is movable up and down. On the other hand, in FIG. 7B, the converting lever 116 is connected to a supporter 121' formed at a lower portion thereof. The converting lever 116 and the supporter 121' are thus movable up and down together.

In FIGS. 7A and 7B, an elastic member 122 is installed between the guide frame 103D and the change rod 120 and 120' at an upper portion of the supporter 121 and 121'.

While the converting lever 116, the guide frame 103D, and the change rod 120 are shown to be installed at the upper side in drawings, they can be formed at the lower side.

The supporter 121 and 121' is connected to the converting lever 116 through the guide frame 103D, and the supporter 121 and 121' has a diameter smaller than that of the converting lever 116.

The supporter 121 and 121' has a diameter smaller than that of the converting lever 116 and the width of the second passages 115B of the model converting device 110 is selected to be between the diameter of the supporter 121 and 121' and the diameter of the converting lever 116. When the converting lever 116 is inserted into an opening 115 of the model converting device 110 a model change operation is completed. The converting lever 116 is prevented from moving along the second passage and as the result, the supporter 121 and 121', the change rod 120 and 120', and the guide frame 103D, and the side plate 125 are prevented from moving.

As aforementioned, the operator moves the converting lever 116 or the change rod 120 and 120' to the upper side of the model converting device 110 according to a size of a glass to be received, and then moves the converting lever 116 along the first passage 115A and then along a second passage 115B of the model converting device 110 to insert the converting lever 116 into an opening 115 of the model converting device 110, the opening 115 formed at a position corresponding to a size of a glass. When, the upwardly moved converting lever 116 or the change rod 120 and 120' is released, the converting lever 116 is returned to the lower original position by the elastic member 122.

As aforementioned, in the cassette of the present invention, the time required to perform a model change operation is decreased and the number of operators required for a model change operation is decreased as well, thereby enhancing productivity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cassette, comprising:
   a frame having a box shape;
   one or more side plates movably positioned at an inner side surface of the frame and having a plurality of slots;
   a model converting device disposed at a certain region of upper and lower surfaces of the frame; and
   a converting lever positioned in the model converting device for moving the one or more side plates according to a size of a glass to be received.

2. The cassette of claim 1, wherein the slots and the one or more side plates are formed of teflon.

3. The cassette of claim 1, wherein the model converting device is installed at each corner of the upper and lower surfaces of the frame.

4. The cassette of claim 1, wherein the model converting device comprises:
   a plate;
   a first passage formed in the plate;
   a plurality of second passages extending from the first passage; and
   an opening formed at an end of the end of each second passages.

5. The cassette of claim 4, wherein a width of each second passage is narrower than a width of the opening at the end of the respective second passage.

6. The cassette of claim 4, wherein the second passages and the openings are respectively formed at positions corresponding to each size of glass to be received.

7. The cassette of claim 4, wherein the converting lever is movable along the first passage and along each of the second passages and is insertable into one of the openings at the end of one of the second passages at a position corresponding to a size of a glass to be received.

8. The cassette of claim 4, wherein the converting lever has a width wider than each of the second passages of the model converting device and narrower than each of the openings at the ends of the second passages of the model converting device.

9. The cassette of claim 4, further comprising a supporter having a width narrower than the second passages of the model converting device, vertically formed and movable in the same direction as the one or more side plates and connected to a lower portion of the converting lever.

10. The cassette of claim 9, further comprising a change rod, vertically formed and movable in the same direction as the one or more side plates and connected to the supporter.

11. The cassette of claim 10, wherein the supporter is inserted into the change rod and is movable with respect to the change rod.

12. The cassette of claim 10, further comprising a guide frame horizontally formed at upper and lower surfaces of the frame and connected to the one or more side plates.

13. The cassette of claim 12, wherein the supporter is connected to the upper converting lever through the guide frame.

14. The cassette of claim 12, further comprising an elastic member installed between the change rod and the guide frame.

15. The cassette of claim 14, wherein the elastic member includes a spring.

16. A method for fabricating an LCD device, comprising:
    preparing a plurality of glass substrates for an LCD device;
    performing an array process or a color filter process on the glass substrates;
    transferring the glass substrates received in a cassette to unit process steps for the array process and the color filter process by moving the cassette comprising a frame having a box shape, one or more side plates movably positioned at an inner side surface of the frame and having a plurality of slots, a model converting device disposed at a certain region of upper and lower surfaces of the frame, and a converting lever positioned in the model converting device for moving the one or more side plates according to a size of a glass to be received;
    attaching two glass substrates having undergone the array process and the color filter process; and
    cutting the attached glass substrates into a plurality of unit LCD panels.

17. The method of claim 16, wherein the model converting device is installed at each corner of upper and lower surfaces of the frame.

18. The method of claim 16, wherein the model converting device comprises:
    a plate;
    a first passage formed in the plate;
    a plurality of second passages extending from the first passage; and
    an opening formed at an end of the end of each second passages.

19. The method of claim 18, wherein a width of each second passage is narrower than a width of the opening at the end of the respective second passage.

20. The method of claim 18, further comprising when a size of a glass to be received is changed, moving the converting lever along the first passage and the second passage and inserting the converting lever into one of the openings at end of one of the second passages at a position corresponding to the changed size.

21. The method of claim 18, wherein the converting lever has a width wider than each of the second passages of the model converting device and narrower than each of openings at the end of the second passages of the model converting device.

22. The method of claim 18, wherein a supporter having a width narrower than the second passage of the model converting device, vertically formed and movable in the same direction as a side plate is connected to a lower portion of the converting lever.

23. The method of claim 22, wherein a change rod vertically formed and movable in the same direction as a side plate is connected to the supporter.

24. The method of claim 23, wherein the supporter is inserted into the change rod and is movable with respect to the change rod.

25. The method of claim 23, wherein a guide frame horizontally is formed at upper and lower surfaces of the frame and connected to the one or more side plates.

26. The method of claim 25, wherein the supporter is connected to the upper converting lever through the guide frame.

27. The method of claim 25, wherein an elastic member is installed between the change rod and the guide frame.

* * * * *